June 28, 1949.  DE WITT C. SHATTUCK  2,474,374
HYDRAULIC HAY FORK
Filed March 19, 1948  2 Sheets-Sheet 1
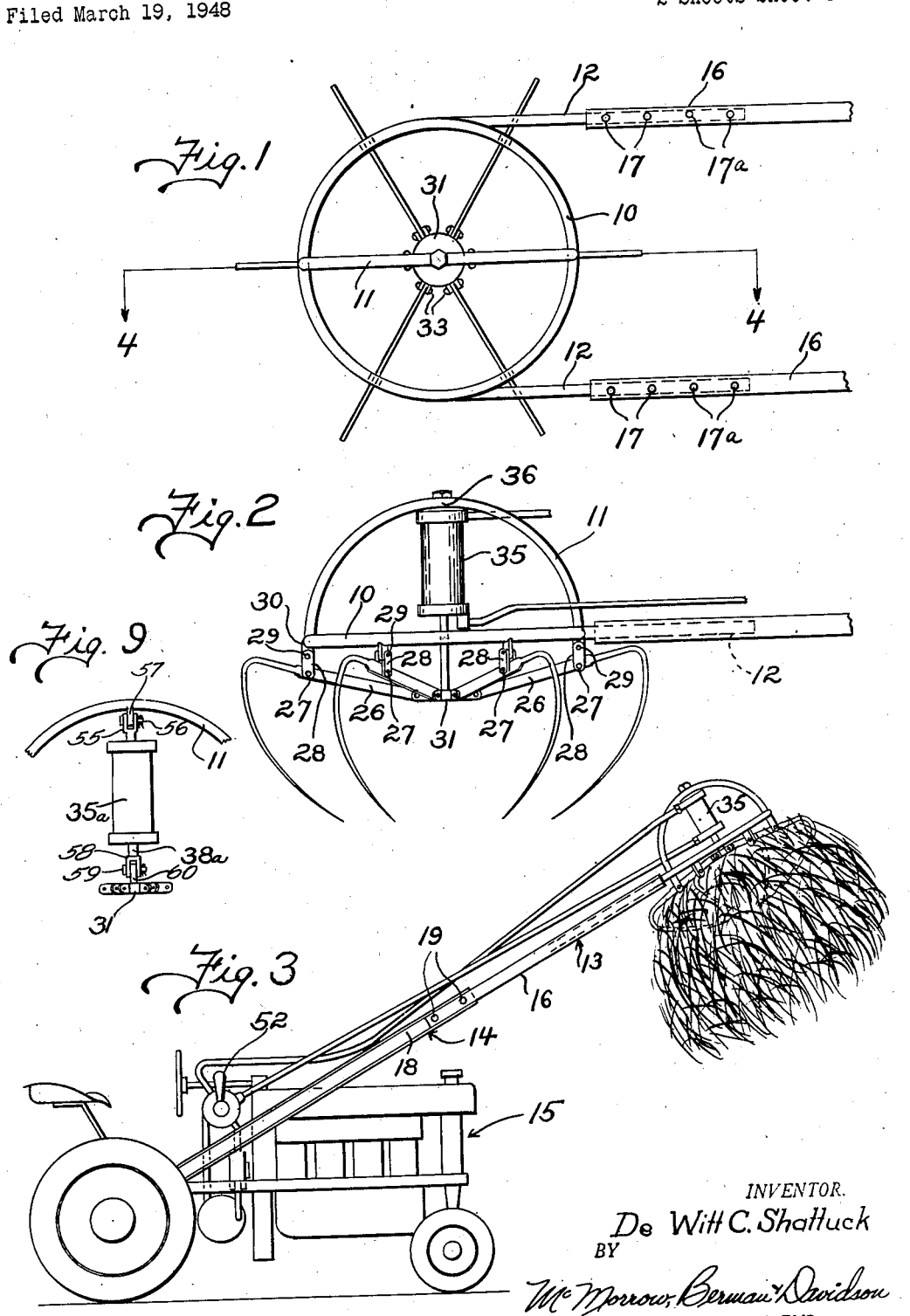
INVENTOR.
De Witt C. Shattuck
BY
*Mc Morrow, Berman & Davidson*
ATTORNEYS June 28, 1949. DE WITT C. SHATTUCK 2,474,374
HYDRAULIC HAY FORK
Filed March 19, 1948 2 Sheets-Sheet 2
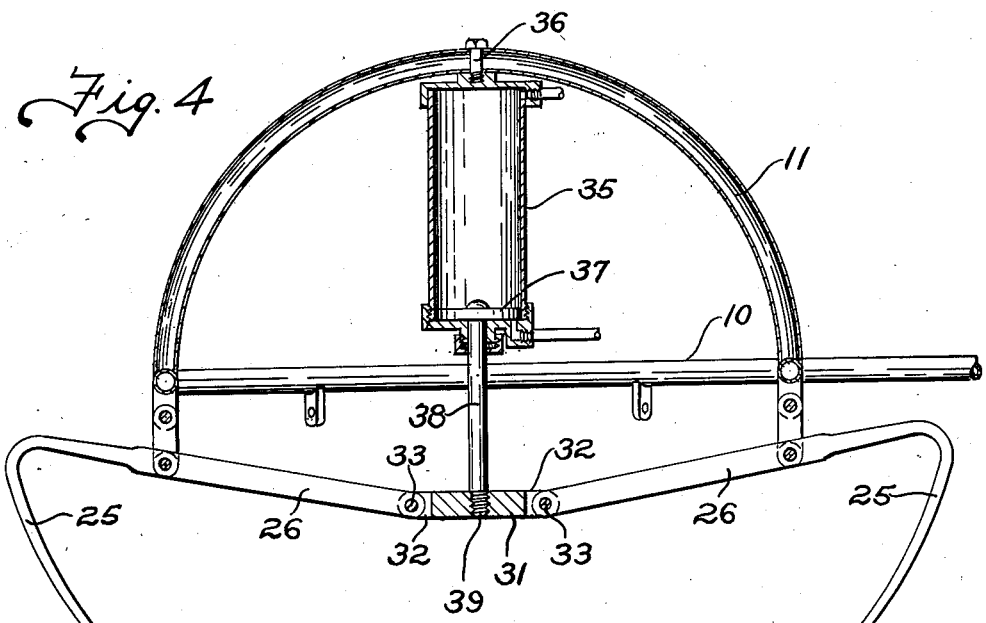
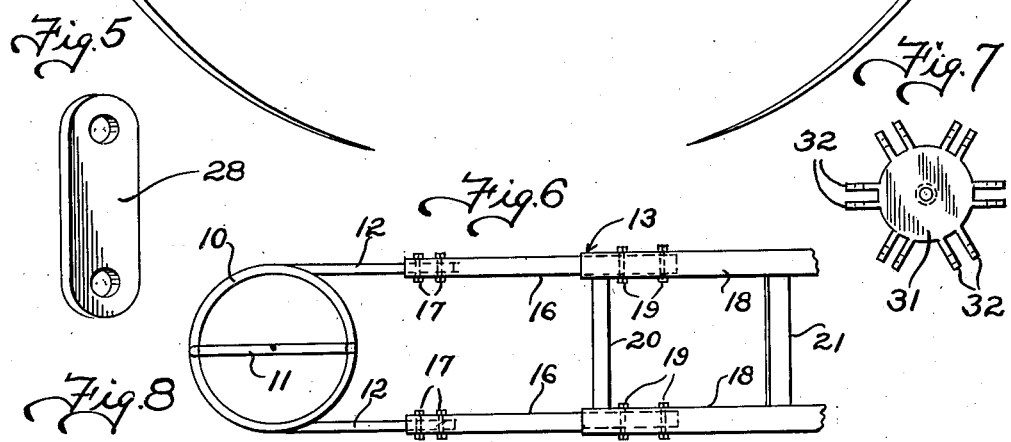
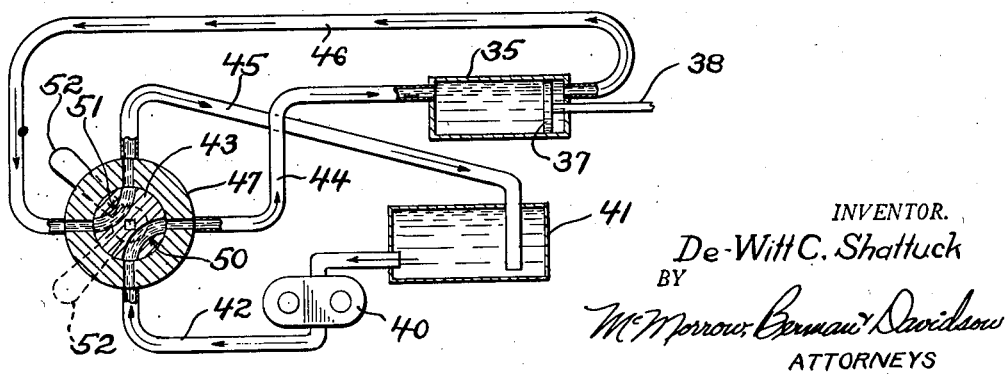
INVENTOR.
De-Witt C. Shattuck
BY
McMorrow, Berman & Davidson
ATTORNEYS Patented June 28, 1949

2,474,374

UNITED STATES PATENT OFFICE 2,474,374

HYDRAULIC HAYFORK

De Witt C. Shattuck, Velva, N. Dak.

Application March 19, 1948, Serial No. 15,851

3 Claims. (Cl. 214—147)

This invention relates to grapples and is directed more particularly to a hydraulic hay fork.

An object of the invention is the provision of a grapple for removing hay from a stack, said grapple having a section of a telescopic boom which may be substituted readily for an installation carrying a manure loader on a tractor, said grapple including a plurality of prongs pivoted on a ring and actuated by a hydraulic means.

A further object of the invention is the provision of a hay fork in which a ring pivotally supports the intermediate portions of a plurality of radially arranged prongs or tines, the inner ends of the prongs having pivotal connections with a movable head located adjacent the center of ring and connected to a hydraulically operated piston in a cylinder that is supported by a curved brace bar attached to the ring, said ring being projected outwardly from a tractor by a specially constructed boom section as a replacement for a manure spreader.

The invention will be best understood from a consideration of the following detailed description, in view of the accompanying drawings forming part of the specification, nevertheless, it is to be understood that the invention is not confined to the disclosure, being susceptible of such changes and modifications which shall define no material departure from the salient features of the invention as expressed in the appended claims.

In the drawings:

Figure 1 is a bottom plan view of my hay fork shown attached to a specially constructed section of a boom, Figure 2 is a side view of the fork shown in Figure 1, Figure 3 is a side view of the fork and boom operatively connected to a tractor, Figure 4 is an enlarged vertical section of the hay fork taken along the line 4—4 of Figure 1, Figure 5 is a view in perspective of a connecting link or hanger for swingably supporting a prong or tine from a circular support for the fork, Figure 6 is a top plan view of a supporting ring for the fork shown attached to a telescoping section of a boom, Figure 7 is a plan view of a movable head upon which the inner ends of the tines or prongs are pivotally mounted and shown as detached from the hay fork or grapple, Figure 8 shows more or less diagrammatically with parts in section of an hydraulically operating means for the hay fork.

Figure 9 is a modified form of the connecting means for a cylinder and piston.

Referring more particularly to the drawings 10 designates a supporting ring formed from a metal tube. A semi-circular tubular bar 11 has its lower ends welded to the ring at diametrically opposite points with the brace bar rising from said ring. A bar 12 is welded at its forward end to each side of the ring and extends inwardly therefrom.

A specially constructed section 13 of a boom 14 attached to a tractor 15 (Figures 3 and 6) has a pair of hollow rods 16 receiving the parallel bars 12 which are adjustably held in place by bolts 17 received in aligned passages in the telescoping rods. The hollow rods 16 are telescoped in a pair of parallel hollow rods 18 and adjustably retained in position by bolts 19. Brace bars 20 and 21 connect the rods 18 together. The rods 18 form the main elements of the boom 14.

Each of the tines or prongs 25 of the fork has a relatively straight flat shank 26 pivoted on a pin 27 carried by a pair of parallel strap hangers 28 suspended by a pin 29 carried by a lug or bracket 30 welded to the bottom of the ring 10 and depending therefrom. These lugs are spaced uniformly around the ring. The tines are curved inwardly so that they may be forced into the hay.

A reciprocating head 31 has its vertical axis in line with the vertical axis of the ring 10. Pairs of spaced perforated ears 32 project from the periphery of the circular head. These ears carry pins 33 which are received by passages in the inner ends of the shanks 26 of the tines 25.

A hydraulic cylinder 35 is supported at its upper closed end by a bolt 36 from the center of the semi-circular brace bar 11. A piston 37 is mounted for reciprocation in said cylinder. A rod 38 secured to and suspended from the piston moves through a passage in the lower closed end of the cylinder 35. The extreme lower end of the rod is threaded at 39 into a central passage in the head 31.

As shown in Figure 8 a hydraulic arrangement is provided for causing reciprocation of the piston, the rod and the head 31. A pump 40 is in communication with a liquid supply tank 41 for oil or water. A pipe 42 is connected between the pump and a two-way valve 43. A pipe 44 conducts liquid under pressure from the valve to the upper end of the cylinder 35 for forcing the piston 37 downwardly. Said pipe acts as an exhaust for the liquid in the upper end of the cylinder when the piston is raised. A pipe 45 between the valves 43 and 41 acts as a return for the liquid.

A pipe 46 not only conducts liquid from the valve 43 to the lower end of the cylinder 35 but acts as a return for the liquid when the piston is forced downwardly as indicated by the arrows.

The valve 43 is located in a casing 47 and has a curved passage 50 aligned as shown in Figure 8 with the pipes 42 and 44. Said valve has a curved passage aligned with the pipes 45 and 46. The valve is operated by a handle 52. When the valve is revolved through 90 degrees, the passage 50 will be aligned with the pipes 44 and 45 while the passage 51 is aligned with the pipes 42 and 46. In this position of the valve, liquid under pressure is forced through the pipe 46 to the bottom of the cylinder 35 for raising the piston 37 while the liquid from the top of the cylinder is forced through pipe 44, the passage 50 and the pipe 44 to the tank 41.

When the piston 37 has been lowered as shown in Figure 4, the free ends of the tines are spread apart and the valve 43 is in the position illustrated in Figure 8. However, when the operating arm 52 has been moved to the dotted line position, the piston is raised as will be the head 31 and the inner ends of the shanks 26 so that the free ends of the tines 25 will be brought together for grappling a load of hay in a stack.

The special section 13 of the boom may be adjusted by placing the bolts 17 in any of the aligned passages 17a in the hollow rods 16 and the bars 12. Thus, when the tractor 15 is moved to the hay stack, it may be necessary to extend or retract the boom so that the hay fork will fall into the proper position on the stack for grappling a load of the hay.

In the modified form shown in Figure 9, the piston 35a has a rigid fork 55 at the upper end connected by a pin 56 to an eye 57 secured to the curved support 11. The piston 38a has a fork 58 connected by a pin 59 to an eye 60 rigid with the head 31. This construction permits the removal of the cylinder and piston for the application of other instrumentalities.

The boom is mounted by two pins or bolts for replacing the usual manure bucket. This mounting also replaces the usual manure loader.

What I claim:

1. A hay fork in the form of a grapple adapted to be carried by a boom on a tractor comprising a ring, a head mounted for reciprocation below said ring and in line with the center thereof, shanks having the inner ends radiating from and pivotally connected to the head, means pivotally suspending the outer ends of the shanks in spaced relation from the under face of the ring, a rod connected to and rising from the center of the head, a piston attached to the upper end of the rod, a cylinder, a curved brace bar connected to and rising over the ring, means securing the upper end of the cylinder to the brace bar, the piston being mounted in the cylinder, means causing reciprocation of the piston for rocking the shanks and likewise the tines, means connecting the ring to the boom, and curved tines projecting downwardly from the outer ends of the shanks.

2. A hay fork for attachment to a boom on a tractor comprising a supporting ring mounted on said boom, a bracing member secured on said ring and extending upwardly over the center thereof, a plurality of peripherally spaced apart tines pivotally connected, intermediate the length thereof, to said ring, a head connected to each of said tines at the inner ends thereof and disposed at the center of said ring, a cylinder carried by said bracing member over the center of said ring, a piston slidable in said cylinder and connected to said ring, and means carried by said tractor engaging said cylinder for selectively pivoting said tines on said ring.

3. A hay rake for attachment to a boom on a tractor comprising a supporting member, means engaging said member and said boom for supporting said member on said boom, radially extending tines pivoted intermediate the length thereof on said supporting member and pivotally connected together at their inner ends, a cylinder supported on said supporting member, a piston slidable in said cylinder and connected to the inner ends of said tines, and means carried by said tractor engaging said cylinder for pivoting said tines to the extended and retracted position.

DE WITT C. SHATTUCK.

REFERENCES CITED

The following references are of record in the file of this patent:

UNITED STATES PATENTS

| Number | Name | Date |
|---|---|---|
| 321,158 | Thompson | June 30, 1885 |
| 477,621 | Bulmer | June 21, 1892 |
| 912,611 | Petersen | Feb. 16, 1909 |
| 1,356,515 | Burgson | Oct. 26, 1920 |
| 1,522,423 | Decarli | Jan. 6, 1925 |
| 1,630,456 | Wehr | May 31, 1927 |
| 2,375,205 | Barras | May 8, 1945 |